(12) United States Patent
Carter

(10) Patent No.: US 7,893,560 B2
(45) Date of Patent: Feb. 22, 2011

(54) LOW POWER ISOLATION DESIGN FOR A MULTIPLE SOURCED POWER BUS

(75) Inventor: Danis E. Carter, Valley Center, CA (US)

(73) Assignee: Nellcor Puritan Bennett LLC, Boulder, CO (US)

( * ) Notice: Subject to any disclaimer, the term of this patent is extended or adjusted under 35 U.S.C. 154(b) by 229 days.

(21) Appl. No.: 12/210,017

(22) Filed: Sep. 12, 2008

(65) Prior Publication Data

US 2010/0066431 A1    Mar. 18, 2010

(51) Int. Cl.
*H02J 9/00*    (2006.01)
(52) U.S. Cl. ...................................................... 307/64
(58) Field of Classification Search ............. 307/64–66; 713/300, 320
See application file for complete search history.

(56) References Cited

U.S. PATENT DOCUMENTS

| | | | |
|---|---|---|---|
| 3,778,634 A * | 12/1973 | Hanrihan | 307/64 |
| 5,598,041 A * | 1/1997 | Willis | 307/43 |
| 5,751,536 A | 5/1998 | Haddad et al. | |
| 5,764,032 A | 6/1998 | Moore | |
| 5,796,274 A | 8/1998 | Willis et al. | |
| 5,867,007 A | 2/1999 | Kim | |
| 5,892,299 A | 4/1999 | Siewert et al. | |
| 5,894,413 A | 4/1999 | Ferguson | |
| 5,945,816 A | 8/1999 | Marusik | |
| 5,952,733 A | 9/1999 | Johnston | |
| 6,031,743 A * | 2/2000 | Carpenter et al. | 363/65 |
| 6,104,103 A | 8/2000 | Siewert et al. | |
| 6,163,086 A | 12/2000 | Choo | |
| 6,189,107 B1 | 2/2001 | Kim et al. | |
| 6,275,958 B1 | 8/2001 | Carpenter et al. | |
| 6,285,091 B1 | 9/2001 | Chan et al. | |
| 6,433,990 B1 | 8/2002 | Rudoy et al. | |
| 6,452,362 B1 | 9/2002 | Choo | |
| 6,462,434 B1 | 10/2002 | Winick et al. | |
| 6,522,190 B1 | 2/2003 | Malik et al. | |
| 6,600,239 B2 | 7/2003 | Winick et al. | |
| 6,823,475 B1 | 11/2004 | Harker | |
| 6,957,048 B2 | 10/2005 | Formenti | |
| 7,038,522 B2 | 5/2006 | Fauh et al. | |
| 7,107,465 B1 | 9/2006 | Foedlmeier | |
| 7,130,169 B2 | 10/2006 | Ziemer et al. | |
| 7,170,197 B2 | 1/2007 | Lopata | |
| 7,521,823 B2 * | 4/2009 | Klikic et al. | 307/66 |
| 7,652,393 B2 * | 1/2010 | Moth | 307/64 |
| 2003/0167415 A1 | 9/2003 | Odaohhara et al. | |
| 2004/0263123 A1 | 12/2004 | Breen et al. | |

FOREIGN PATENT DOCUMENTS

| | | |
|---|---|---|
| EP | 0695017 A | 1/1996 |
| EP | 0736828 A | 10/1996 |

* cited by examiner

*Primary Examiner*—Albert W Paladini

(57) ABSTRACT

A redundant power supply connected to a common load is provided. Each power supply is connected to the common load through a series of MOSFET pairs. Each MOSFET in a MOSFET pair is individually controlled to reduce power consumption as well as the need for heat sinks on discrete diodes. Moreover, by providing individually controllable MOSFETs the present invention is capable of switching between power supplies without shorting the power supplies or having a significant drop in bus voltage.

24 Claims, 4 Drawing Sheets

LOW POWER ISOLATION DESIGN FOR A MULTIPLE SOURCED POWER BUS

FIELD

The present invention is generally directed to redundant power supplies and more particularly to mechanisms for connecting redundant power supplies to a common load.

BACKGROUND

Critical power consuming systems which require an uninterrupted power supply are commonly connected to at least two redundant power supply sources. It is typically the case that one of the power supplies is a primary power supply and all other power supplies are backup power supplies provided in case the primary power supply fails or otherwise becomes incapable of providing the necessary power to the power consuming system. Redundant power supplies are very common in many medical applications, such as ventilators, since breath delivery may depend upon power being continuously provided to the power consuming system. Redundant power supplies are also common in many other mission critical applications such as computing applications, database applications, refrigeration systems, and so on.

Prior and existing redundant power supply designs utilize discrete diodes to isolate different power sources that are connected to a common power bus. As can be seen in FIG. 1, each power source 104a, 104b in a redundant power supply system 100 generally has its own discrete diode 108a, 108b, respectively, that controls the amount of power provided by each source 104 to the power consuming load 116. A capacitor 112 may also be connected in parallel across the load 116 to provide temporary power to the bus and hence to the load 116.

The discrete diodes 108 serve to avoid short circuits between power supplies 104a, 104b and also protect the load 116 from reversed polarity. If one of the power supplies 104a fails, the load 116 can continue to operate with power supplied from the other power supply 104b without a power interruption.

While this solution is popular and has been used in many power consuming systems, there are several disadvantages to utilizing the discrete diodes 108. First of all, the diodes 108 dissipate a non-trivial amount of power. This causes the overall efficiency of the system 100 to decrease due to the losses realized in the diodes 108. Additionally, since the diodes 108 dissipate so much power they also generate heat. This creates a need for attaching heat sink devices to the diodes 108 to help cool the diode 108 in systems that deliver significant power. Without the heat sink devices, the diode 108 could overheat and become inoperable, thereby jeopardizing the entire system 100.

SUMMARY

There have been some attempts to address the shortcomings associated with utilizing discrete diodes to isolate power supplies. One such example is provided in U.S. Pat. No. 7,038,522 to Fauh et ale, the entire contents of which are hereby incorporated herein by reference. Fauh provides a redundant power supply that utilizes MOSFETs to isolate power supplies. While Fauh has recognized the shortcomings of utilizing discrete diodes to isolate power supplies, Fauh still has disadvantages. For example, each pair of MOSFETs in Fauh are controlled with a single control signal. Hence, all MOSFETs associated with a particular power supply are either active or inactive together depending upon the single control signal received.

Thus, in Fauh, a first power supply must be disconnected from the load before a second power supply can be connected to the load, otherwise there may be a risk of shorting the power supplies. The amount of time between when the first power supply is disconnected and the second power supply is connected can cause the bus voltage at the load to drop significantly. The significant potential drop in bus voltage necessitates a relatively larger capacitor to support the bus voltage during the transition. Since a storage capacitor's cost increases as the capacitor's capacity increases, the cost of implementing such a system also increases. Other disadvantages exist with large storage capacitors such as time to charge and larger inrush transients. A larger capacitor also requires more volume, a disadvantage in a space constrained product.

Some embodiments of the present invention provide a more cost effective and efficient redundant power supply system and methods of operating such a system. In accordance with at least some embodiments of the present invention, a redundant power supply system is provided that generally includes a first power supply operable to provide power to a load via a first isolation switch comprising at least two switching devices, a second power supply operable to provide power to the load via a second isolation switch comprising at least two switching devices, and a controller operable to independently control each switching device in the first and second isolation switches.

The use of a controller that is operable to independently control each switching device (e.g., each Field Effect Transistor (FET) in a FET pair associated with a power supply) provides a number of advantages over the prior art. For example, in some embodiments the load is provided continuously with power from a power supply, since the falling power supply will not compromise the other power supply. In some aspects, this occurs because the backup source is diode-OR'd into the bus and the bus voltage will not fall more than a diode drop (e.g., 0.7V) below the backup supply level. This may be particularly advantageous in healthcare applications, such as ventilator applications, where a temporary power loss can be extremely detrimental.

In some embodiments, the FET's body diode and the proper sequencing of FETs in the power switching network help save power, and the discrete diodes and heat sinks may not be needed. At the end of the switching sequence, when the bus is solely connected to the desired power supply, in some embodiments the isolation feature of the body diode is not needed and the FET having the isolation diode is activated. As a result, the final FET activation reduces or eliminates the power loss in the body diode.

Some embodiments of the present invention benefit from the discrete isolation-diode topology, but also take advantage of the parasitic body diode in the FET, thus eliminating parts, and shunts the power dissipating diode when the switching is complete.

In accordance with at least some embodiments of the present invention, a method of operating a redundant power supply system is also provided that generally includes:

determining that a first power supply connected to a load via a first isolation switch and providing power to the load has a decreasing voltage, wherein the first isolation switch comprises at least two switching devices; and independently controlling each switching device in the first isolation switch to cause power to be supplied to the load by a second power supply.

In accordance with at least some embodiments of the present invention, the power supplies may or may not provide an identical or even relatively similar voltage. For example, one power supply may be an AC-to-DC converter that conditions AC power from a wall into a 24V dc source. The other power supply (i.e., a backup power supply) may be a 24V battery. Alternatively, the other power supply may be a 28V dc battery (e.g., a fully charged battery). These are merely exemplary power supply operating voltages that can be supported with embodiments of the present invention. One skilled in the art will appreciate that embodiments of the present invention are not limited to such exemplary voltages discussed herein and that other power source may be accommodated with the appropriate use of other circuit devices.

Additional features and advantages of embodiments of the present invention will become more readily apparent from the following description, particularly when taken together with the accompanying drawings.

DETAILED DESCRIPTION

Figure 1:
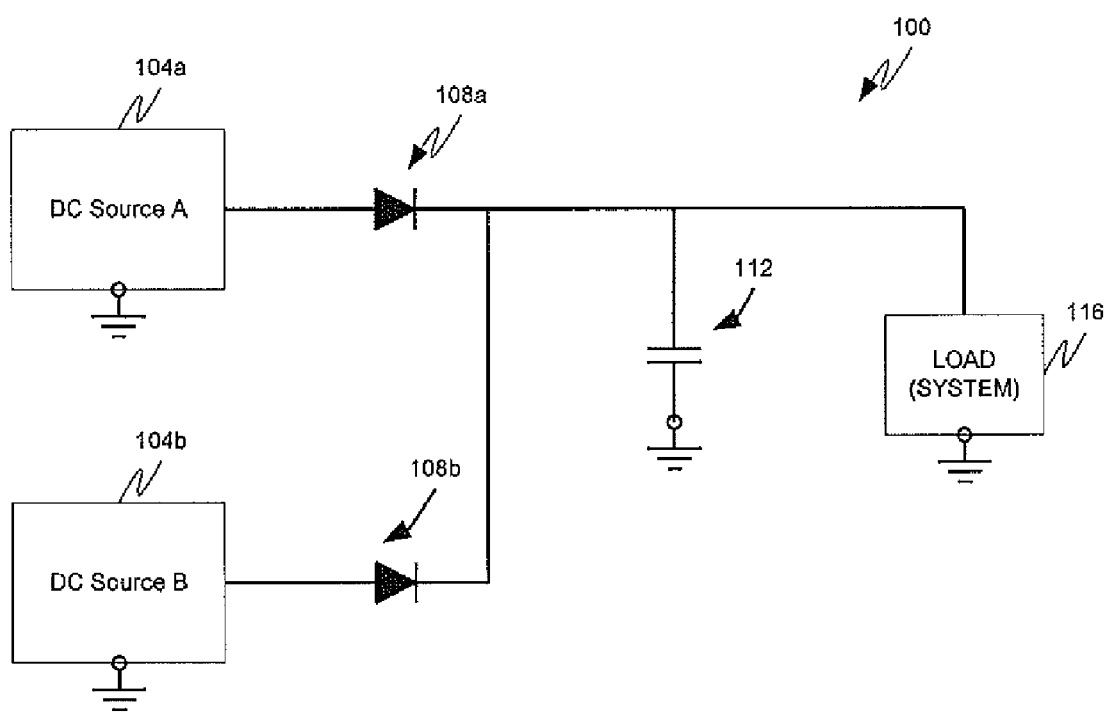
FIG. 1 is a schematic diagram depicting a redundant power supply connected to a common load in accordance with embodiments of the prior art.
Figure 2:
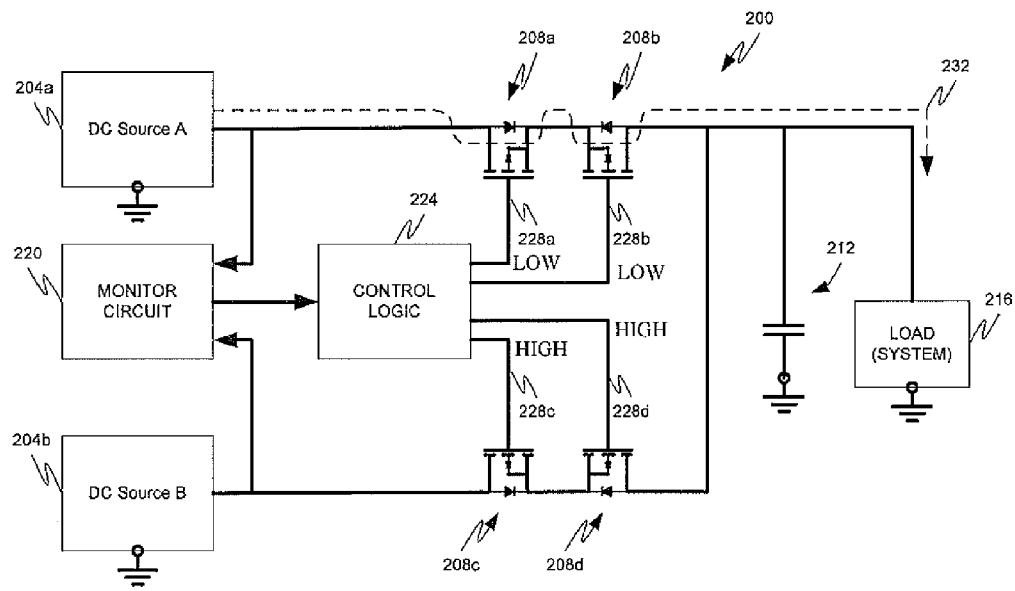
FIG. 2 is a schematic diagram depicting a Source A supplying power to a load with a Source B power supply in a standby state in at least some embodiments of the present invention.

With reference now to FIG. 2, an exemplary redundant power supply system 200 will be described in accordance with at least some embodiments of the present invention. The power supply system 200 may comprise a first power supply 204a and a second power supply 204b operable to provide power to a load 216 along with a capacitor 212 to control a bus voltage at the load 216. In one embodiment, first power supply 204a may be in communication with or connected in circuit with the load 216 via a pair of switching devices 208a, 208b. Similarly, the second power supply 204b may be in communication with or connected in circuit with the load 216 via a pair of switching devices 208c, 208d.

The load 216 may correspond to any type of circuit adapted to receive and utilize electrical power. For example, the load 216 may be circuitry associated with a ventilator system. Alternatively, the load 216 may be any kind of circuitry, including for example a server, communications gear, a computer, an IV pump, security electronics, etc.

In accordance with at least some embodiments of the present invention, the switching devices 208 may be any type of Field Effect Transistor (FET) such as a p-channel MOSFET, n-channel MOSFET, or any other type of current/voltage control mechanism. In accordance with at least some embodiments of the present invention, a switching device 208 used to control whether current flows from a power supply 204 to the load 216 may be variably adjustable. More specifically, while embodiments of the present invention discuss operating the switching devices 208 in either an active or inactive state, the switching devices 208 do not necessarily need to operate in only two binary states.

Instead, one or both switching devices 208 associated with a particular power supply 204 may be capable of variably controlling the amount of current flowing there through (i.e., the amount of current provided to the load 216). This may occur, in some embodiments, by pulsing the gate and controlling the on-time duty cycle of one or both switching devices 208. Each pair of switching devices (e.g., the first and second MOSFETs 208a and 208b collectively) may be referred to herein as an isolation switch. In one embodiment, the MOSFETs 208 each comprise an intrinsic body diode.

In the configuration depicted in FIG. 2, the first and second transistors 208a, 208b associated with the first power supply 204a are in an active state and substantially no current flows through the body diodes of the transistors 208a, 208b. Rather, a current (depicted by a dashed arrow 232) flows through the transistors 208a, 208b without encountering any substantial resistance and without incurring any significant amount of losses. This current 232 is used to provide electrical power to the load 216. Meanwhile, third and fourth transistors 208c, 208d associated with the second power supply 204b are in an inactive state and the body diode of the fourth transistor 208d is substantially inhibiting current from flowing between the second power supply 204b and the load 216.

Although the current inhibiting switching devices 208b, 208d (e.g., the second and fourth transistors 208b, 208d comprising the backward biased body diode) are depicted as being behind the first and third switching devices 208a, 208c (i.e., the second and fourth switching devices 208b, 208d are down circuit from the first and third switching devices 208a, 208c), one skilled in the art will appreciate that the order of the switching devices 208 is not limited to the depicted embodiments. As an example, the second and fourth switching devices 208b, 208d (i.e., the current inhibiting switching devices 208b, 208d having the backward biased diode) may be up circuit from the first and third switching devices 208a, 208c and the overall operation of the system 200 will remain substantially the same.

The operational states of each switching device 208 may be independently controlled by a controller 224. The controller 224 may comprise a control output 228a-d for each of the switching devices 208a-d, respectively. Furthermore, the controller 224 may receive input from a monitor circuit 220 that is capable of monitoring the relative potential of each power supply 204a, 204b. In accordance with at least one embodiment of the present invention, the monitor circuit 220 is operable to monitor the supply voltages of each power supply 204a, 204b and compare them to each other.

In accordance with at least some embodiments of the present invention, the monitor circuit 220 may comprise a collection of discrete, linear devices, i.e. comparators and operational amplifiers that are adapted to receive voltage inputs from each of the power supplies 204a, 204b and compare said voltages. The output of the monitor circuit 220 may correspond to the output of an operational amplifier and may be provided as an input to the controller 224. The controller 224 may comprise a digital signal processor, a firmware, or other component that is or can be adapted to receive and understand the comparison information provided by the monitor circuit 220 and then control the switching devices 208 based on the comparison information. In an alternative embodiment, the monitor circuit 220 and controller 224 may be combined into a single element such as a digital signal processor with an analog-to-digital converter that is capable of monitoring the power supply voltages and then making a control decision based on that comparison.

When the monitor circuit 220 and controller 224 are provided as separate elements, the results of the comparison made by the monitor circuit 220 may be sent to the controller 224 where the decision is made as to whether or not a switch needs to be made between sources of power being supplied to the load 216. In accordance with at least one embodiment of the present invention, the monitor circuit 220 may compare the relative voltages of the power supplies 204a, 204b and if one of the power supplies (e.g., the first power supply 204a) has a voltage that exceeds the voltage of the other power supply (e.g., the second power supply 204b) by a predetermined threshold, then the controller 224 may cause the power supply to the load 216 to switch to the preferred source of power. It should be noted, however, that in certain embodiments a particular voltage difference threshold may need to be exceeded before a switch from one power supply 204 to another occurs since the higher power supply 204 may be a fully charged battery that is desired to be maintained as the backup source for emergency situations.

Referring now to FIGS. 3-6, a sequence of switching from one power supply to another power supply will be described in accordance with at least some embodiments of the present invention. Initially, the system 200 may operate in the configuration depicted in FIG. 2. In this normal power supply configuration, power is supplied to the load 216 via the first power supply 204a and its associated switching devices 208a, 208b are in an active state (i.e., the first and second switching devices 208a, 208b are switched to a state that causes current to bypass the body diode of the switching devices 208a, 208b). Additionally, the capacitor 212 is fully charged and the bus current 232 flows through the switching devices 208a, 208b directly to the load 216.

However, once the monitor circuit 220 and controller 224 have determined that a switch needs to be made from the first power supply 204a to the second power supply 204b (e.g., because a critical drop in the voltage provided by the first power supply 204a has been detected by the monitor circuit 220), then the controller 224 begins to initiate the switching sequence depicted in FIGS. 3-6. The following sequence of events is typically initiated when the monitor circuit 220 detects that the voltage of the first power supply 204a is beginning to decay or has decayed and the voltage of the second power supply 204b is at an adequate level. Other thresholds and events may also be used to initiate the switching sequence within the scope of the present invention, including for example the loss of AC Mains, a possible attack on a premise, an earthquake or other natural disruption of power, or the like.

Figure 3:
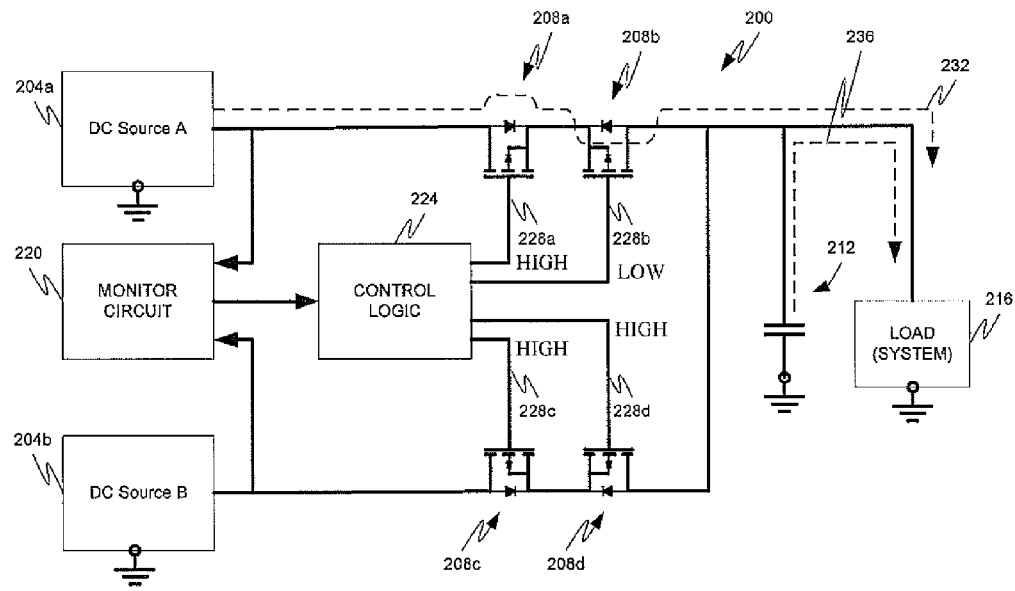
FIG. 3 is a schematic diagram depicting a first sequence step of switching from a first power supply source to a second power supply source in accordance with at least some embodiments of the present invention.

As a first step in the sequence, the controller 224 may cause the first switching device 208a to go from an active state to an inactive state. As can be seen in FIG. 3, this may be accomplished by transmitting a high control signal on the first control line 228a to the first switching device 208a associated with the first power supply 204a. It should be noted that while the depicted embodiments of the present invention utilize a low control signal to activate a switching device 208 and a high control signal to deactivate a switching device 208, alternative designs can be implemented whereby a high control signal is used to activate a switching device 208 and a low control signal is used to deactivate a switching device 208.

Once the first switching device 208a associated with the first power supply 204a is deactivated, current 232 flows through the body diode of the first switching device 208a. Also during this state the third and fourth switching devices 208c, 208d remain in an inactive state. Thus, as the current 232 begins to drop due to the losses of the body diode in the first switching device 208a, the capacitor 212 begins to discharge and holds up the bus voltage by providing a supplemental current 236 into the load 216.

Figure 4:
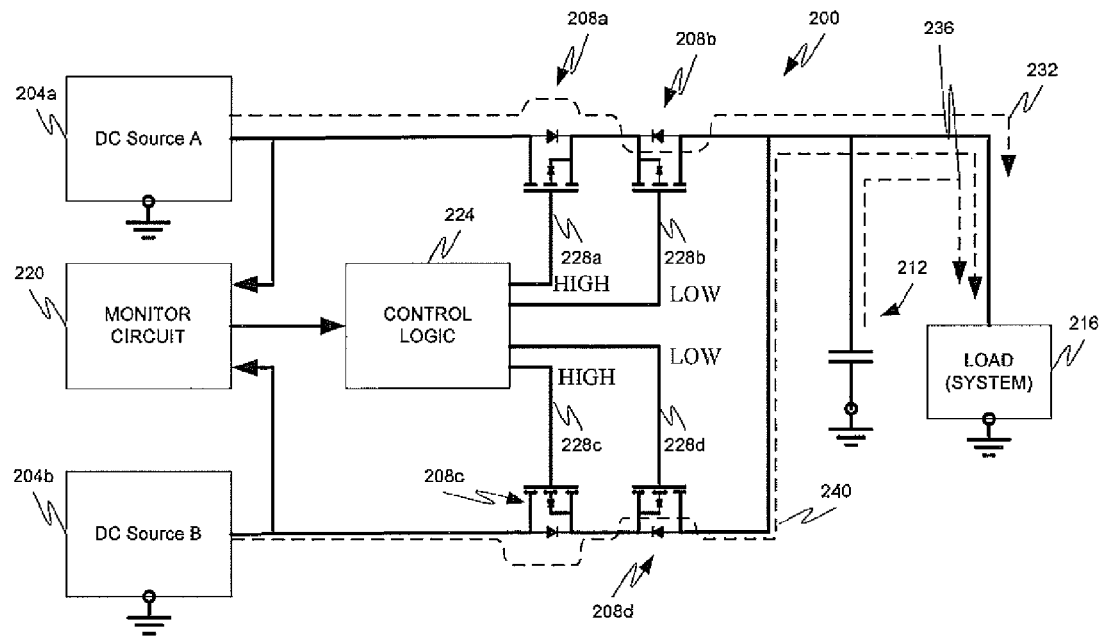
FIG. 4 is a schematic diagram depicting a second sequence step of switching from a first power supply source to a second power supply source in accordance with at least some embodiments of the present invention.

The next step of the sequence is depicted in FIG. 4. In the next step of the sequence, the voltage of the first power supply 204a continues to decay and the second power supply 204b is switched into the bus by activating the fourth switching device 208d. This is accomplished by having the controller 224 send an activate signal (e.g., a low control signal) on the control line 228d to the fourth switching device 208d. When the fourth switching device 208d is activated, current 240 begins to flow through the third switching device 208c, because the reversed biased body diode of the fourth switching device 208d has been bypassed. While current 232 continues to flow from the first power supply 204a, the second power supply 204b also begins to provide power to the load 216 via current 240.

It should also be noted that during this stage of the switching sequence current is flowing through the body diodes of the first and third switching devices 208a and 208c. However, since this state is maintained for only a brief moment (for example, in one embodiment for less than 100 ms), an insignificant amount of heat generated by the body diodes. Since there is only a small amount of heat generated in the body diodes before the switching sequence continues, in some embodiments there is no need to attach a heat sink to the switching devices 208a, 208c. In an alternative embodiment, one or more heat sinks (not shown) may be used. In some embodiments, the supplemental current 236 may also continue to be provided to the load 216 as needed.

Figure 5:
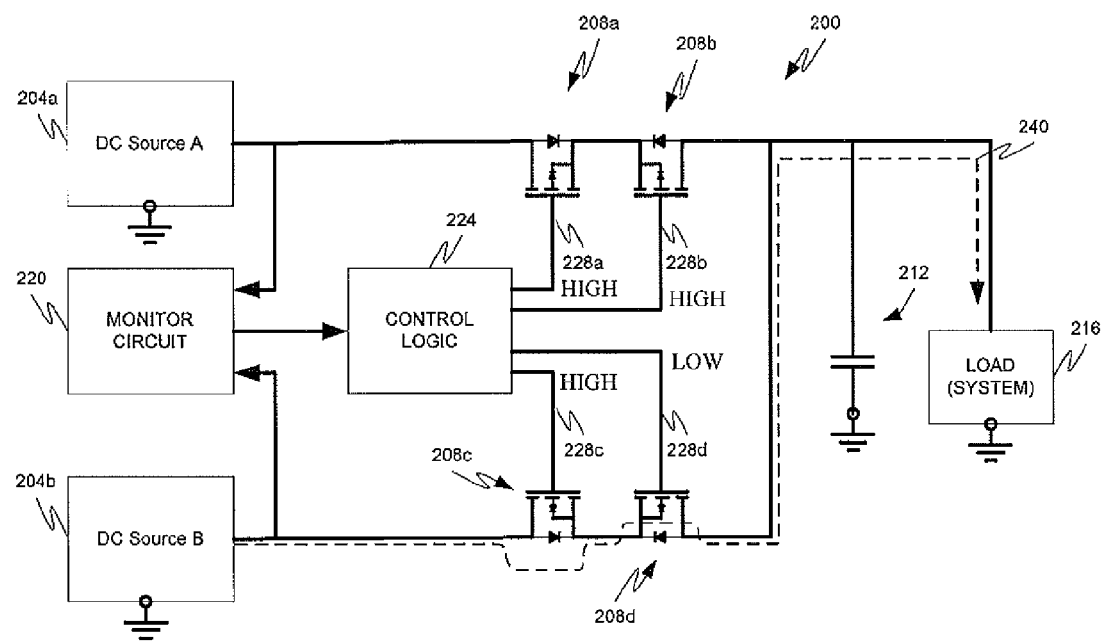
FIG. 5 is a schematic diagram depicting a third sequence step of switching from a first power supply source to a second power supply source in accordance with at least some embodiments of the present invention.

The switching sequence continues when the controller 224 deactivates the second switching device 208b. As can be seen in FIG. 5, the decaying power source (i.e. the first power supply 204a) is electrically disconnected from the bus and, therefore, is no longer used to supply power to the load 216. At this point in the switching sequence, the bus voltage is now supplied by the second power supply 204b. The current 240 from the second power supply 204b continues to flow through the body diode of the third switching device 208e and also flows through the fourth switching device 208d bypassing its body diode. Again, while the current 240 does pass through the body diode of the third switching device 208c, the length of time that this particular state is maintained is relatively short and the body diode doesn't have enough time to generate a significant amount of heat that would necessitate the use of a heat sink. In an alternative embodiment, a heat sink (not shown) is included to help ensure the dissipation of heat.

Figure 6:
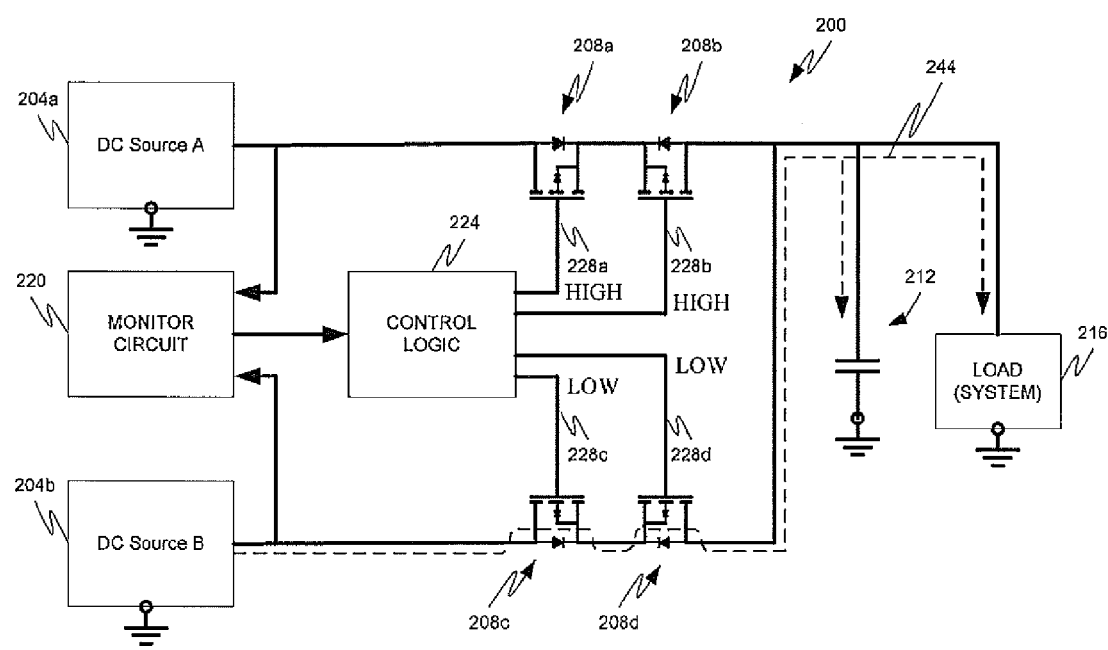
FIG. 6 is a schematic diagram depicting a fourth sequence step of switching from a first power supply source to a second power supply source in accordance with at least some embodiments of the present invention.

Referring now to FIG. 6, the controller 224 activates the third switching device 208c. The decaying first power source 204a is still not enabled to provide power to the load 216. Since the third switching device 208c has been activated, the current 244 through the third switching device 208c is shunted around its body diode. Thus, substantially no additional current is flowing through any diodes in the system 200. This allows the bus capacitor 212 to begin charging a diode drop higher in voltage (e.g., 0.7V) with the current 244 provided by the second power supply 204b. The capacitor 212 will eventually reach a full charge and the current 244 from the second power supply 204b will be the primary current used to power the load 216.

In accordance with at least some embodiments of the present invention, the entire switch sequence depicted in FIGS. 3-6 may be executed in a thermally insignificant amount of time, i.e. perhaps 50 ms. By switching through the sequence this quickly the amount of heat generated in any particular diode is minimal and does not require a heat sink. As can be appreciated by one skilled in the art, the switching sequence may be executed in a greater or lesser amount of time depending upon the amount of power required by the load 216, the size of the power supplies 204, the nature of the switching devices 208, the type of controller 224 being utilized, and other factors, taken alone or in various combinations. The timing of the switching sequence discussed herein can be design dependent and is not limited to the examples discussed. One advantage of the present invention is that while it may be desirable to switch between power supplies 204 within 50 ms, embodiments of the present invention can allow many seconds of time, depending on the particular body diode parameters. As an example, MOSFETs with a larger current capability will take a longer amount of time to switch "off" Than MOSFETs with a relatively smaller current capability.

Additionally, since there is a point in time during the switching sequence where both power supplies 204 are providing power to the load 216, the size of capacitor 212 required to support the necessary bus voltage can be significantly less than would be required if the switching devices 208 associated with a particular power supply 204 were switching on or off together. This reduces the overall costs of implementing the redundant power supply system 200. There may be some applications where the internal capacitance of the device may be significant enough that a bus capacitor is not required. This can be realized with bypass capacitors on Printed Circuit Boards (PCBs) within the electronic loads.

Although only two power supplies 204 are depicted, one skilled in the art will appreciate that additional power supplies (e.g., an additional one, two, three, four, or more) with some or all having a corresponding pair of switching devices may be added to the redundant power supply system 200. This may be accomplished by adding the additional power supply and pair of switching devices in parallel to the existing power supplies. Independent control lines from the controller 224 may be connected to any additional switching devices when additional power supplies are provided.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system, comprising:
  a first power supply operable to provide power to a load via a first isolation switch comprising at least two switching devices;
  a second power supply operable to provide power to the load via a second isolation switch comprising at least two switching devices; and
  a controller operable to independently control each switching device in the first and second isolation switches.

2. The system of claim 1, wherein the controller comprises a signal processor based circuit design having at least four outputs, wherein each output of the circuit is associated with and used to provide control signals to a different switching device.

3. The system of claim 1, wherein the at least two switching devices in the first and second isolation switches are MOSFETs.

4. The system of claim 3, wherein a first MOSFET associated with the first isolation switch comprises an intrinsic diode forward biased from the first power supply to the load and wherein a third MOSFET associated the second isolation switch comprises an intrinsic diode forward biased from the second power supply to the load.

5. The system of claim 4, wherein a second MOSFET associated with the first isolation switch comprises an intrinsic diode backward biased from the first power supply to the load and wherein a fourth MOSFET associated with the second isolation switch comprises an intrinsic diode backward biased from the second power supply to the load.

6. The system of claim 5, wherein the second MOSFET is between the first MOSFET and the first power supply and wherein the fourth MOSFET is between the third MOSFET and the second power supply.

7. The system of claim 1, further comprising a monitor circuit operable to monitor the first and second power supplies and their respective potential and provide a signal to the controller indicating the potential of each power supply.

8. The system of claim 7, wherein the first power supply is a primary power supply, wherein the second power supply is a backup power supply, and wherein upon receiving an indication from the monitor circuit that the first power supply has a decreasing potential the controller is operable to sequentially and discretely control the switching devices in the first and second isolation switches thereby causing the first power supply to discontinue providing power to the load and further causing the second power supply to provide power to the load.

9. The system of claim 8, wherein while the controller is sequentially and discretely controlling the switching devices power is provided to the load by both the first and second power supplies.

10. The system of claim 1, wherein the controller comprises at least one of firmware and a digital signal processor.

11. A method, comprising:
  determining that a first power supply connected to a load via a first isolation switch and providing power to the load has a decreasing voltage, wherein the first isolation switch comprises at least two switching devices; and
  independently controlling each switching device in the first isolation switch to cause power to be supplied to the load by a second power supply.

12. The method of claim 11, further comprising causing the first power supply to discontinue providing power to the load.

13. The method of claim 11, wherein the second power supply is connected to the load via a second isolation switch that comprises at least two switching devices.

14. The method of claim 13, further comprising independently controlling each switching device in the second isolation switch.

15. The method of claim 13, further comprising the steps:
  switching a first switching device associated with the first isolation switch from an active to an inactive state;

switching a second switching device associated with the second isolation switch from an inactive to an active state;

switching a fourth switching device associated with the first isolation switch from an active to an inactive state; and switching a third switching device associated with the second isolation switch from an inactive to an active state.

16. The method of claim 15, wherein the first switching device comprises an intrinsic diode forward biased from the first power supply to the load, wherein the third switching device comprises an intrinsic diode forward biased from the second power supply to the load, wherein the second switching device comprises an intrinsic diode backward biased from the first power supply to the load, and wherein the fourth switching device comprises an intrinsic diode backward biased from the second power supply to the load.

17. The method of claim 16, wherein the second switching device is between the first switching device and the first power supply and wherein the fourth switching device is between the third switching device and the second power supply.

18. The method of claim 13, wherein the at least two switching devices in the first and second isolation switches are MOSFETs.

19. The method of claim 11, wherein during the controlling step power is provided to the load by both the first and second power supplies.

20. A computer readable medium comprising processor executable instructions that, when executed, perform the method of claim 11.

21. A power consuming load operable to receive power from at least one of a first and second power supply, wherein the first and second power supplies are each separately operable to provide power to the load via a pair of switching devices, wherein an operational state of each switching device associated with each power supply is independently controlled by a controller.

22. The load of claim 21, wherein the controller comprises first, second, third, and fourth control outputs, wherein signals transmitted on the first control output are used to control the operational state of a first switching device associated with the first power supply, wherein signals transmitted on the second control output are used to control the operational state of a second switching device associated with the first power supply, wherein signals transmitted on the third control output are used to control the operational state of a third switching device associated with the second power supply, and wherein signals transmitted on the fourth control output are used to control the operational state of a fourth switching device associated with the second power supply.

23. The load of claim 21, wherein the first power supply comprises an AC power supply and the second power supply comprises a battery.

24. The load of claim 21, wherein the second power supply is in communication with a medical ventilator.

* * * * *